United States Patent [19]

Negus

[11] Patent Number: 5,208,984
[45] Date of Patent: May 11, 1993

[54] MULTI-PURPOSE SCRAPING APPARATUS

[75] Inventor: Joel A. Negus, Clarinda, Iowa

[73] Assignee: Lisle Corporation, Clarinda, Iowa

[21] Appl. No.: 679,518

[22] Filed: Apr. 2, 1991

[51] Int. Cl.[5] .............................................. B26B 3/00
[52] U.S. Cl. ...................................... 30/169; 30/329; 15/236.01
[58] Field of Search ................. 30/169, 171, 329, 330, 30/331, 334, 338; 15/236.01, 236.02

[56] References Cited

U.S. PATENT DOCUMENTS

| | | | |
|---|---|---|---|
| 1,710,113 | 4/1929 | Rothermel | 15/236.01 |
| 1,827,509 | 10/1931 | Ericsson | 30/329 |
| 2,233,184 | 2/1941 | Rufleth | 30/329 |
| 2,693,029 | 11/1954 | Kass | 30/171 |
| 3,855,700 | 12/1974 | Gerson et al. | 30/169 |
| 3,895,439 | 7/1975 | Ehrenberg et al. | 30/171 |
| 4,381,604 | 5/1983 | Horst | 15/236.01 |
| 4,481,689 | 11/1984 | Westmoreland | 15/236 R |

OTHER PUBLICATIONS

Part No. 2106, All-Purpose Scraper and Sticker Remover, shown on p. 81, K-D Tools catalogue (Specialty Tools).
Part No. 51250, Adjustable Scraper, in Lisle Catalogue T-41.

Primary Examiner—Frank T. Yost
Assistant Examiner—Hwei-Siu Payer
Attorney, Agent, or Firm—Allegretti & Witcoff, Ltd.

[57] ABSTRACT

A multi-purpose scraping apparatus is disclosed which enables the interchangeability of scraping blades. The apparatus is made of a handle, a shank and a blade receiving assembly, the shank being interposed between the handle and the blade receiving assembly. The blade receiving assembly comprises a back plate, a spring plate, a spring tongue and means for securing the spring plate to the back plate. The spring tongue extends from the spring plate and provides means for moving the blade receiving assembly from a gripping position to a releasing position. The back plate and the spring plate are thus constructed and arranged to cooperatively engage a blade to be used with the apparatus and to bias the blade receiving assembly in the gripping position. Thus, the spring tongue is moveable to effect movement of the blade receiving assembly from the gripping position to the releasing position.

6 Claims, 2 Drawing Sheets

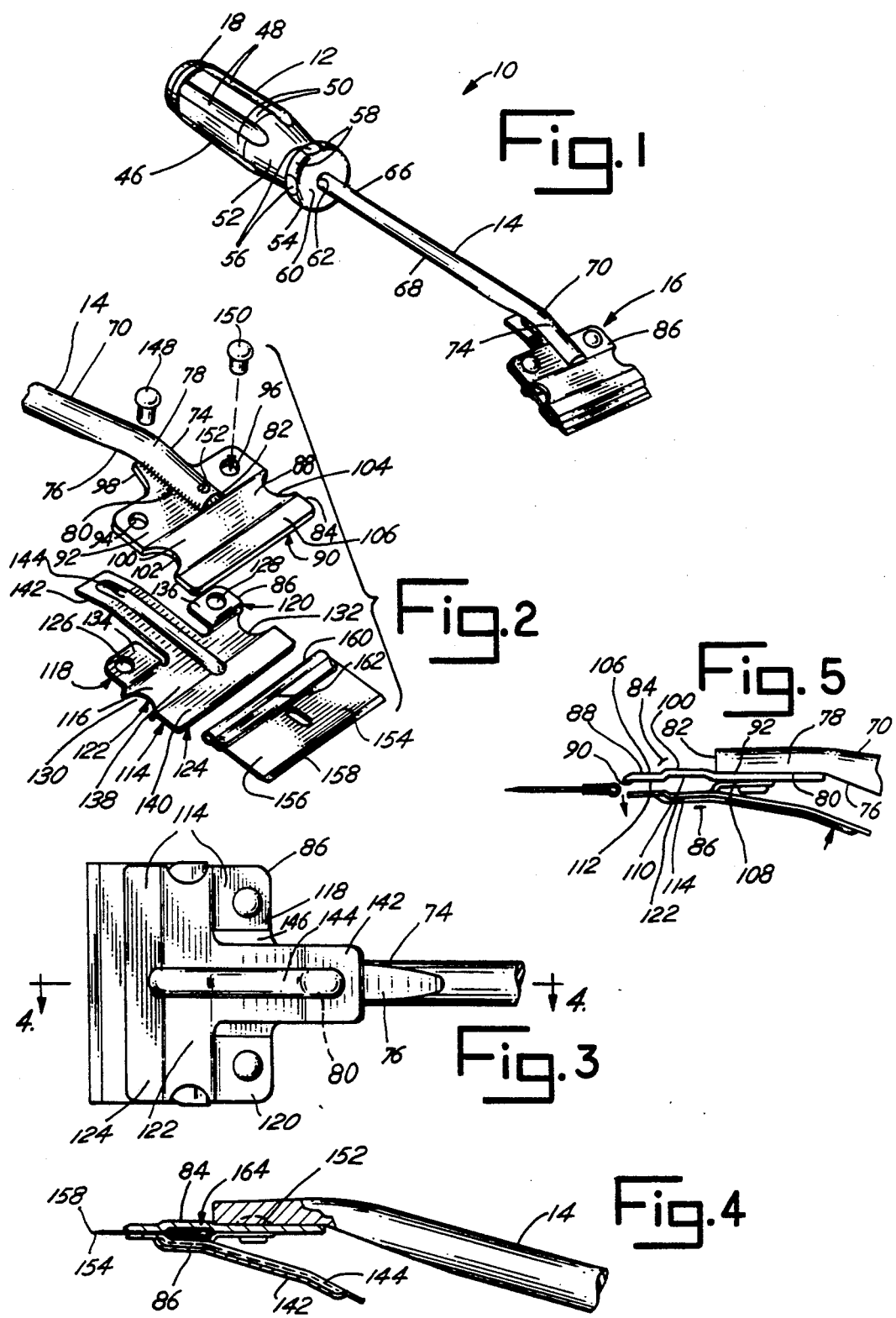

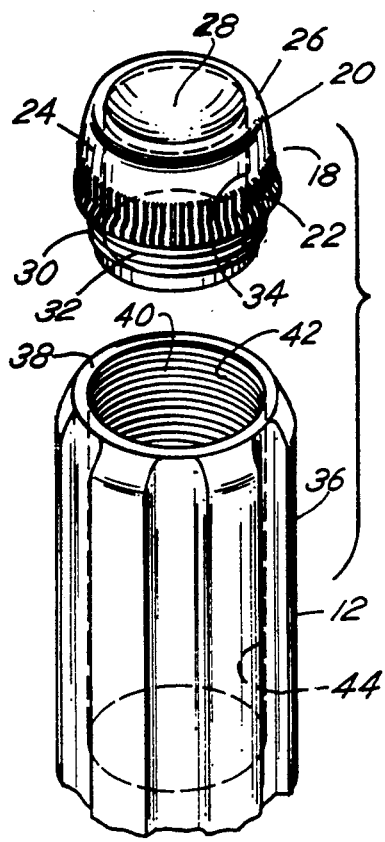
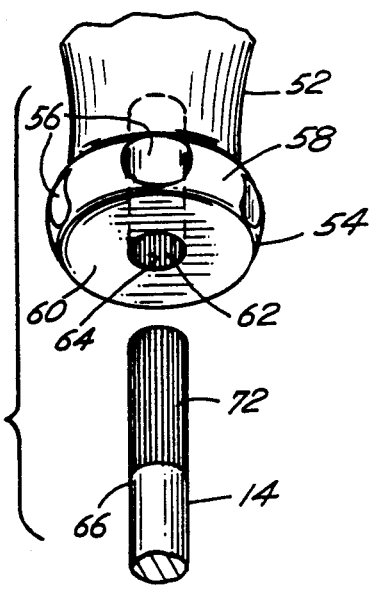
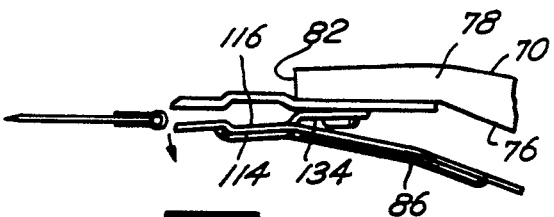
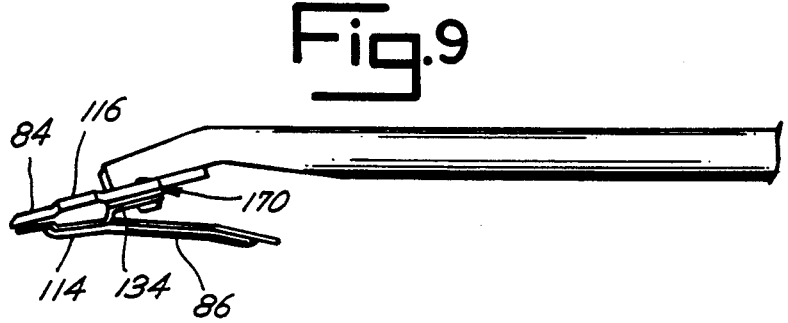
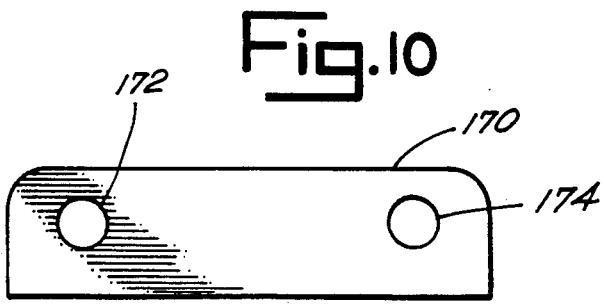

MULTI-PURPOSE SCRAPING APPARATUS

BACKGROUND OF THE INVENTION

In a principal aspect, the present invention relates to an multi-purpose scraping apparatus for scraping decals from the inside of the windshield of an automobile. Specifically, such a tool is designed to be usable with replaceable blades, so that the blades may be interchanged as they wear out. Furthermore, such a tool is designed for use with different types of blades, as steel blades are optimal for some applications but are not appropriate for others, and various materials, sharpnesses and sizes of blades are desired in various applications.

A particular problem associated with scraping the interior surfaces of automobile windshields is that reaching the lower most portion of the windshield while still maintaining a proper grip on the scraper is often difficult. In other words, to scrape the lower portion of an automobile windshield, particularly in a more sleekly designed car with the newer, more aerodynamic, sloping windshield, requires that the user lean forward and extend downward in reaching the lower portion of the windshield. This is particularly difficult to do when substantial grip is required on the scraping apparatus. This problem renders it very difficult to fit a conventional razor blade scraper between the dashboard and the windshield to remove decals that have been placed in the lower most corners of the windshield. As decals are most often placed in the lower corners of the windshield so as to be inconspicuous to the field of vision, this problem has become particularly acute, indeed.

Many designs of scraping apparatus have been constructed which enable the user to have a long reach, but these typically deprive the user of an effective grip. Similarly, many designs of scraping apparatus have been constructed which enable the user to have an effective grip, but these typically deprive the user of a long reach. No scraping apparatus has been constructed to permit both a long reach and an effective grip while at the same time providing the advantages, structure and features of the present invention.

An even more particular problem associated with the use of scraping apparatus is that of effecting sufficient scraping force on windshields that are provided with protective films or defroster apparatus. These windshields cannot be scraped with steel surfaces, as the steel surface may damage protective films and delicate options, such as, ultraviolet screens, tinting, or defrosting wires. More recently, as automobile windows and/or windshields have been furnished with Instaclear brand defrosting apparatus, the suitability of a steel blade or other similarly hard material for scraping has become more questionable.

Yet another problem associated with the use of scraping apparatus particularly those that are provided with means for interchanging blades, is that of storage of extra blades. These replacement blades are often lost or otherwise not where the user needs them at the time of replacement.

Yet another problem associated with the use of scraping apparatus is that releasing a blade for interchangeability is often difficult and requires undue exertion. Thus, a user who does not possess a strong grip may be unable to effect interchange of the blades.

Yet another problem associated with the use of scraping apparatus is that of keeping the blades in place during vigorous use of the apparatus. Thus, although too weak a retaining force may facilitate an easy change of blades, the blade may become dislodged during the use of the scraping apparatus.

Yet another problem associated with the use of scraping apparatus is that the releasing mechanism may be easily deformed, particularly when the retaining force is enhanced and the ease of interchangeability is also optimized.

The present invention constitutes an improved multi-purpose scraping apparatus that seeks to overcome these problems, while at the same time providing a simple, easily constructed design that is readily adapted to a variety of uses.

SUMMARY OF THE INVENTION

Briefly, the present invention comprises a multi-purpose scraping apparatus for scraping the inside of a windshield of an automobile.

Thus, it is an object of the present invention to provide a multi-purpose scraping apparatus that is compact in both its structure and usage and can be used on automobile windshields, thereby facilitating the scraping of decals, stickers, etc. from the inside of the windshield and enhancing visibility for the automobile operator.

A further object of the present invention is to provide a multi-purpose scraping apparatus that is simply designed and inexpensive to manufacture, maintain and use.

Yet a further object of the present invention is to provide a multi-purpose scraping apparatus that can accommodate a wide variety of blade sizes, sharpness and materials and thereby permit use on many different automobile windshields.

An even further object of the present invention is to provide a multi-purpose scraping apparatus that has a construction providing for a strengthened blade gripping means that is nevertheless easily manipulated so as to effect release of the blade, thereby facilitating the change of blades for multi-purpose use.

Yet another object of the present invention is to provide a multi-purpose scraping apparatus that offers a wider range of operability due to its combination of compact size and its ability to accommodate varied blades.

A further object of the present invention is to provide a multi-purpose scraping apparatus that has means for storing extra blades in its body.

Still a further object of the present invention is to provide a multi-purpose scraping apparatus that has a releasing means for releasing an old blade and inserting a new blade, to facilitate the interchangeability of the blades.

An even further object of the present invention is to provide a multi-purpose scraping apparatus having a means for firmly retaining the blade in place so as to prevent dislodgement of the blade during vigorous use of the apparatus.

Another object of the present invention is to provide a multi-purpose scraping apparatus having a releasing means that is durable notwithstanding the substantial spring bias provided in the means for firmly retaining the blade in place.

These and other objects, advantages and features of the present invention will be apparent from the detailed description that follows.

BRIEF DESCRIPTION OF THE DRAWING

In the detailed description that follows, reference will be made to the drawing comprised of the following eight figures:

FIG. 1 is an upper perspective view illustrating a preferred embodiment of the apparatus as it is positioned for receipt of a scraping blade;

FIG. 2 is a top plan view illustrating a portion of the preferred embodiment of FIG. 1;

FIG. 3 is a bottom plan view illustrating the preferred embodiment of FIG. 1;

FIG. 4 is a side plan view of a portion of the preferred embodiment of FIG. 1 in a gripping position;

FIG. 5 is a side plan view of a portion of the preferred embodiment of FIG. 1 in a releasing position;

FIG. 6 is a top plan perspective view illustrating a portion of the preferred embodiment of FIG. 1;

FIG. 7 is a bottom perspective view illustrating a portion of the preferred embodiment of FIG. 1;

FIG. 8 is a side plan view of a portion of the preferred embodiment of FIG. 1 in a releasing position;

FIG. 9 is a side plan view of a portion of a second preferred embodiment of the apparatus in a gripping position; and FIG. 10 is a top plan view illustrating a portion of the preferred embodiment of FIG. 9.

DETAILED DESCRIPTION OF THE DRAWING

As can be seen by FIG. 1, the multi-application scraping apparatus 10 has a handle 12, a shank 14 and a blade receiving assembly 16. In the preferred embodiment, the handle 12 is further provided with a screw cap 18. Referring now to FIG. 6, the screw cap 18 has a screw cap head portion 20. Gripping ridges 22 are provided on the screw cap to facilitate removal of the screw cap from the handle 12. Thus, the screw cap 18 has a smooth upper head portion 24 and a bevelled crown 26 near the upper portion of the screw cap 18. A top depression 28 is provided at the top of the screw cap 18 to facilitate extreme gripping effort of the scraper 10 by placement of a thumb on the top depression 28.

The screw cap 18 further has a neck portion 30 which is provided with a male thread 32. As shown in the preferred embodiment, the screw cap 18 is further provided with a hollow interior space 34.

Referring still to FIG. 6, the handle 12 has an upper portion 36, a top face 38 and a cap receiving aperture 40. Inside the cap receiving aperture 40, the handle 12 is provided with a female thread 42 to receive the male thread 32 of the screw cap 18, thus defining means for securing the cap 18 to the handle 12. Further, the handle 12 is provided with a blade storage space 44 to provide means for storage of blades to be used in the scraping apparatus 10.

Referring now back to FIG. 1, the handle 12 has a handle body 46 which is provided with longitudinal grooves 48 disposed about its periphery. The grooves 48 define ridges 50 which in combination with the grooves 48 facilitate gripping of the handle 12 by the user of the scraping apparatus 10. The handle 12 further has a tapered torso 52 at its proximal end and a handle lip 54 which is constructed and arranged with the tapered torso 52 so as to further facilitate gripping of the handle 12. The handle lip 54 is also provided with lip grooves 56 which define lip ridges 58, thereby even further facilitating gripping of the handle 12.

The handle 12 has a handle face 60 which is orientated substantially perpendicularly to the handle lip 54. A shank aperture 62 is provided in the center of the handle face 60 and is constructed and arranged to receive the shank 14. As can be seen in FIG. 7, the interior portion of the shank aperture 62 has shank aperture grooves 64 which are constructed and arranged to facilitate receipt of the shank 14.

Referring now to FIG. 1, the shank 14 has a handle end portion 66, a shank central portion 68 and a blade end portion 70. Referring now back to FIG. 7, the handle end portion 66 of the shank 14 is provided with shank ridges 72 which are constructed and arranged to be received in the shank aperture grooves 64 of the shank aperture 62 in the handle 12.

Referring now to FIG. 2, the blade end portion 70 of the shank 14 has a curved tip 74. The curved tip 74 has a flat lower end 76, shown in FIG. 3, and a curved top side 78. The curved tip 74 is provided with a flat lower extremus 80 which is constructed and arranged to fit snugly against the blade assembly 16. Furthermore, the curved tip 74 of the blade end portion 70 of the shank 14 is provided with a truncated blade end terminus 82.

Referring now to FIGS. 2 and 5, the blade assembly 16 is provided with a back plate 84 and a spring plate 86. The back plate 84 has a back plate outer face 88 and a back plate inner face 90. The outer face 88 has a proximal flat portion 92 located at the shank end of the blade assembly 16. The proximal flat portion 92 has a first rivet receiving hole 94 and a second rivet receiving hole 96 and is provided with a tapered proximal terminus 98 which is constructed and arranged to be secured against the flat lower side 80 of the shank 14.

Referring now again to FIGS. 2 and 5, the back plate outer face 88 of the back plate 84 has a back plate outer face ridge 100 which is elevated in relation to the proximal flat portion 92 of the back plate outer face 88. The ridge 100 is provided with lateral indentations 102 and 104, shown in FIG. 2, which facilitate removal of the a blade to be used with the scraping apparatus 10. In addition, the back plate outer face 88 has a distal flat portion 106 which is located at the furthest end of the blade receiving assembly 16.

Likewise, as shown in FIG. 5, the back plate inner face 90 has a proximal flat portion 108 located at the proximal end of the blade assembly 16. The back plate inner face 90 is also provided with a depression 110 and a distal flat portion 112 which correspond to the ridge 100 and distal flat portion 106 of the back plate outer face 88. The depression 110 is depressed in relation to the proximal flat portion 108. Thus, the back plate 84 is constructed and arranged to be of substantially uniform thickness throughout its entirety, such that the proximal flat portions 92, 108 of the outer face 88 and inner face 90 are correlative, the ridge 100 and depression 110 are correlative, and the distal flat portions 106, 112 are correlative.

In corresponding fashion, as shown in FIG. 2 and 8, the spring plate 86 is also provided with an outer face 114 and an inner face 116. The outer face 114 of the spring plate 86 has a first proximal flat portion 118, a second proximal flat portion 120, a ridge 122 and a distal flat portion 124. The first proximal flat portion 118 is provided with a first rivet receiving hole 126, and the second proximal flat portion 120 is provided with a second rivet receiving hole 128. The ridge 122 is provided with lateral indentations 130, 132.

The inner face 116 of the spring plate 86 is likewise provided with a first proximal flat portion 134, a second proximal flat portion 136, a depression 138 and a distal flat portion 140. These features correlate with the features of the outer face 114 of the spring plate 86, in analogous fashion to the correlation as described above for the back plate 84. Thus, the spring plate 86 is constructed and arranged to be of substantially uniform thickness throughout its entirety, such that the first proximal flat portions 118, 134 of the outer face 114 and inner face 116 are correlative, the second proximal flat portions 120, 136 of the outer face 114 and inner face 116 are correlative, the ridge 122 and the depression 138 of the outer face 114 and inner face 116 are correlative, and the distal flat portions 124, 140 of the outer face 114 and inner face 116 are correlative.

Connected to the spring plate 86 is a spring tongue 142, which extends from the raised ridge 122 of the spring plate 86. The spring tongue 142 has disposed through its center a stiffening ridge 144 which extends beyond the terminus of the spring tongue 142 through the center of the ridge 122 and terminates in the distal flat portion 124 of the spring plate 86. The spring tongue 142 thus provides releasing means for releasing a blade from the blade receiving assembly 16.

As shown, the first proximal flat portion 118 of the spring plate 86 and the second proximal flat portion 120 of the spring plate 86 do not define a continuous flat portion, as does the proximal flat portion 92 of the back plate 84. Instead, the first and second proximal flat portions 118, 120 are separated by a spring tongue cut out 146 which is constructed and arranged to optimize the spring tension on the spring tongue 142.

Finally, rivets 148, 150 are received through the rivet receiving holes 94, 96 of the back plate 84 and the rivet receiving holes 126, 128 of the spring plate 86 and provide means for securing the spring plate 86 to the back plate 84. A spot weld 152 defines means for adhering the back plate 84 to the flat lower side 80 of the shank 14. The spring plate 86 and the back plate 84 are constructed and arranged so as to be biased in a gripping position. The spring plate 86 is thus movable in relation to the back plate 84 by applying a force to the spring tongue 142, thereby moving the blade receiving assembly from the gripping position to the releasing position.

Thus, the scraper 10 is constructed and arranged to receive a blade 154. The blade 154 is generally available as either a stainless steel blade or plastic blade, but it is understood that the blade 154 can be made of any suitable material that can be utilized for the scraping operation envisioned. The blade 154 has a central portion 156, a sharp edge 158 and a safety edge 160. Often, the blade 154 has a ridge 162 along the safety edge 160 to facilitate securing the blade 154 in a scraping apparatus, such as the apparatus 10 shown in the present invention.

Thus, as shown in FIG. 4, the back plate 84 and the spring plate 86 provide means for securing a blade 154 in the scraping apparatus 10. The blade 154 can be orientated such that the sharp edge 158 is orientated outward for scraping use. Alternatively, the blade 154 can be orientated inward so that the sharp edge 158 is contained within the means for securing the blade 154 and the scraper 10, and the safety edge 160 is orientated outward, for storage purposes.

Thus, as used, blades that are not in use can be stored in the blade storage space 44 of the scraping apparatus 10 contained within the handle 12. The blade 154 that is in use or that is being stored outside the blade storage space 44 is then secured between the spring plate 86 and the back plate 84 as described above.

The back plate 84 and the spring plate 86 are biased in a gripping position, such that the distal flat portion 112 of the inner face 90 of the back plate 84 is in or near contact with the distal flat portion 140 of the inner face 116 of the spring plate 86. The depression 110 of the inner face 90 of the back plate 84 and the depression 138 of the inner face 116 of the spring plate 86 are maintained and biased in spaced apart relation, providing means for receiving the ridge 162 of the safety edge 160 of a blade 154. The proximal flat portion 108 of the inner face 90 of the back plate 84 is in or near contact with the first and second proximal flat portions 134, 136 of the inner face 116 of the spring plate 86 and thereby prevent the ridge 162 of the safety edge 160 of the blade 154 from moving in a proximal direction.

The blade receiving assembly 16 is thus biased in a gripping position. To move the blade receiving assembly 16 to a releasing position, the spring tongue 142 is depressed toward the shank 14, thereby permitting the spring plate 86 to pivot slightly away from the back plate 84 along a pivoting axis which is defined by the line extending through the rivets 148, 150 that connect the spring plate 86 to the back plate 84. The pivoting axis is therefore substantially perpendicular to the shank 14.

Referring now to FIG. 9, a second preferred embodiment of the apparatus is shown. The apparatus as shown in FIG. 9 is identical in all respects to the first preferred embodiment, except that a stop plate 170 is interposed between the back plate 84 and the spring plate 86.

Referring now to FIG. 10, the stop plate 170 is provided with a pair of rivet passages 172, 174 which are constructed and arranged to facilitate passage of the rivets 148, 150.

The invention therefore provides an apparatus for use of interchangeable blades of varying materials such that multiple applications of the scraper 10 can be made. The foregoing detailed description describes a preferred embodiments of the invention. It is clear, however, that these preferred embodiment may be variously modified. Therefore, to particularly point out and distinctly claim the subject matter regarded as invention, the following claims conclude this specification.

What is claimed is:

1. A multi-purpose scraping apparatus comprising, in combination:
   a handle, a shank, and a blade receiving assembly;
   the handle being constructed and arranged to facilitate gripping thereof by a human hand, and having means for securing the shank to the handle;
   the shank being connected to the handle at one end and the blade receiving assembly at its opposite end, thereby maintaining the handle and the blade receiving assembly in spaced apart relation;
   the blade receiving assembly comprising a back plate, a spring plate, a spring tongue and means for securing the spring plate to the back plate;
   the back plate being connected to the shank; the spring plate being secured to the back plate; the spring tongue extending from the spring plate and providing means for moving the blade receiving assembly from a gripping position to a releasing position;
   the back plate and the spring plate being constructed and arranged to cooperatively engage a blade to be used with the scraping apparatus and to bias the blade receiving assembly in the gripping position; whereby the spring tongue is moveable to effect movement of the blade receiving assembly from the gripping position to the releasing position;

the back plate having an outer face and an inner face;

the outer face having a proximal flat portion located proximate to the shank, a ridge and a distal flat portion, the ridge having at least one lateral indentation and being elevated in relation to the proximal flat portion;

the inner face having a proximal flat portion located proximate to the shank, a depression and a distal flat portion, the depression being depressed in relation to the proximal flat portion;

the back plate being constructed and arranged to be of substantially uniform thickness;

the spring plate having an outer face and an inner face; the outer face having a first proximal flat portion and a second proximal flat portion located proximate to the shank, a ridge and a distal flat portion, the ridge having at least one lateral indentation and being elevated in relation to the proximal flat portions;

the inner face having a first proximal flat portion and a second proximal flat portion located proximate to the shank, a depression and a distal flat portion, the depression being depressed in relation to the proximal flat portions;

the spring plate being constructed and arranged to be of substantially uniform thickness;

the means for securing the spring plate to the back plate defining a pivoting axis being substantially perpendicular to the shank; and the distal flat portion of the inner face of the back plate being proximate to the distal flat portion of the inner face of the spring plate when the blade receiving assembly is in the gripping position, and the distal flat portion of the inner face of the back plate being moveable away from the distal flat portion of the inner face of the spring plate by depressing the spring tongue and moving the blade receiving assembly into the releasing position.

2. A multi-purpose scraping apparatus as shown in claim, 1, the handle further comprising:

a handle body, a tapered torso at its proximal end, a handle lip and a handle face;

the handle body having a plurality of longitudinal grooves defining ridges, the tapered torso interposed between the handle body and the handle lip;

the handle lip having a plurality of lip grooves defining lip ridges, the handle lip being interposed between the tapered torso and the handle face;

the handle face being substantially perpendicular to the handle lip and having a shank aperture in its center;

the shank aperture having grooves disposed in its interior being constructed and arranged to facilitate receipt of the shank;

the shank further comprising a handle end portion, a shank central portion and a blade end portion;

the handle end portion having shank ridges; and the shank ridges being received in the shank aperture grooves of the handle.

3. A multi-purpose scraping apparatus as shown in claim 2, the blade end portion of the shank further comprising:

a curved tip having a flat lower end, a curved top side, a flat lower extremus, and a truncated blade terminus; and the flat lower extremus being connected to the back plate of the blade receiving assembly by means for adhering the back plate to the flat lower extremus of the shank.

4. A multi-purpose scraping apparatus comprising, in combination:

a handle, a shank, and a blade receiving assembly;

the handle being constructed and arranged to facilitate gripping thereof by a human hand, and having means for securing the shank to the handle;

the shank being connected to the handle at one end and the blade receiving assembly at its opposite end, thereby maintaining the handle and the blade receiving assembly in spaced apart relation;

the blade receiving assembly comprising a back plate, a stop plate, a spring plate, a spring tongue and means for securing the spring plate to the back plate;

the back plate being connected to the shank; the stop plate being secured to the back plate; the spring plate being secured to the stop plate; the spring tongue extending from the spring plate and providing means for moving the blade receiving assembly from a gripping position to a releasing position;

the back plate and the spring plate being constructed and arranged to cooperatively engage a blade to be used with the scraping apparatus and to bias the blade receiving assembly in the gripping position; whereby the spring tongue is movable to effect movement of the blade receiving assembly from the gripping position to the releasing position;

the back plate having an outer face and an inner face;

the outer face having a proximal flat portion located proximate to the shank, a ridge and a distal flat portion, the ridge having at least one lateral indentation and being elevated in relation to the proximal flat portion;

the inner face having a proximal flat portion located proximate to the shank, a depression and a distal flat portion, the depression being depressed in relation to the proximal flat portion;

the back plate being constructed and arranged to be of substantially uniform thickness;

the spring plate having an outer face and an inner face; the outer face having a first proximal flat portion and a second proximal flat portion located proximate to the shank, a ridge and a distal flat portion, the ridge having at least one lateral indentation and being elevated in relation to the proximal flat portions;

the inner face having a first proximal flat portion and a second proximal flat portion located proximate to the shank, a depression and a distal flat portion, the depression being depressed in relation to the proximal flat portions;

the spring plate being constructed and arranged to be of substantially uniform thickness;

the means for securing the spring plate to the back plate defining a pivoting axis being substantially perpendicular to the shank; and the distal flat portion of the inner face of the back plate being proximate to the distal flat portion of the inner face of the spring plate when the blade receiving assembly is in the gripping position, and the distal flat portion of the inner face of the back plate being moveable away from the distal flat portion of the inner face of the spring plate by depressing the spring tongue and moving the blade receiving assembly into the releasing position.

5. A multi-purpose scrapping apparatus as shown in claim 4, the handle further comprising:
   a handle body, a tapered torso at its proximal end, a handle lip and a handle face;
   the handle body having a plurality of longitudinal grooves defining ridges, the tapered torso interposed between the handle body and the handle lip;
   the handle lip having a plurality of lip grooves defining lip ridges, the handle lip being interposed between the tapered torso and the handle face;
   the handle face being substantially perpendicular to the handle lip and having a shank aperture in its center;
   the shank aperture having grooves disposed in its interior being constructed and arranged to facilitate receipt of the shank;
   the shank further comprising a handle end position, a shank central portion and a blade end portion;
   the handle end portion having shank ridges; and
   the shank ridges being received in the shank aperture grooves of the handle.

6. A multi-purpose scraping apparatus as shown in claim 5, the blade end portion of the shank further comprising:
   a curved tip having a flat lower end, a curved top side, a flat lower extremus, and a truncated blade terminus; and
   the flat lower extremus being connected to the back plate of the blade receiving assembly by means for adhering the back plate to the flat lower extremus of the shank.

* * * * *